M. M. GOLDENSTEIN.
MOTOR CONTROLLER.
APPLICATION FILED MAY 17, 1915.
1,234,151.
Patented July 24, 1917.
2 SHEETS—SHEET 1.
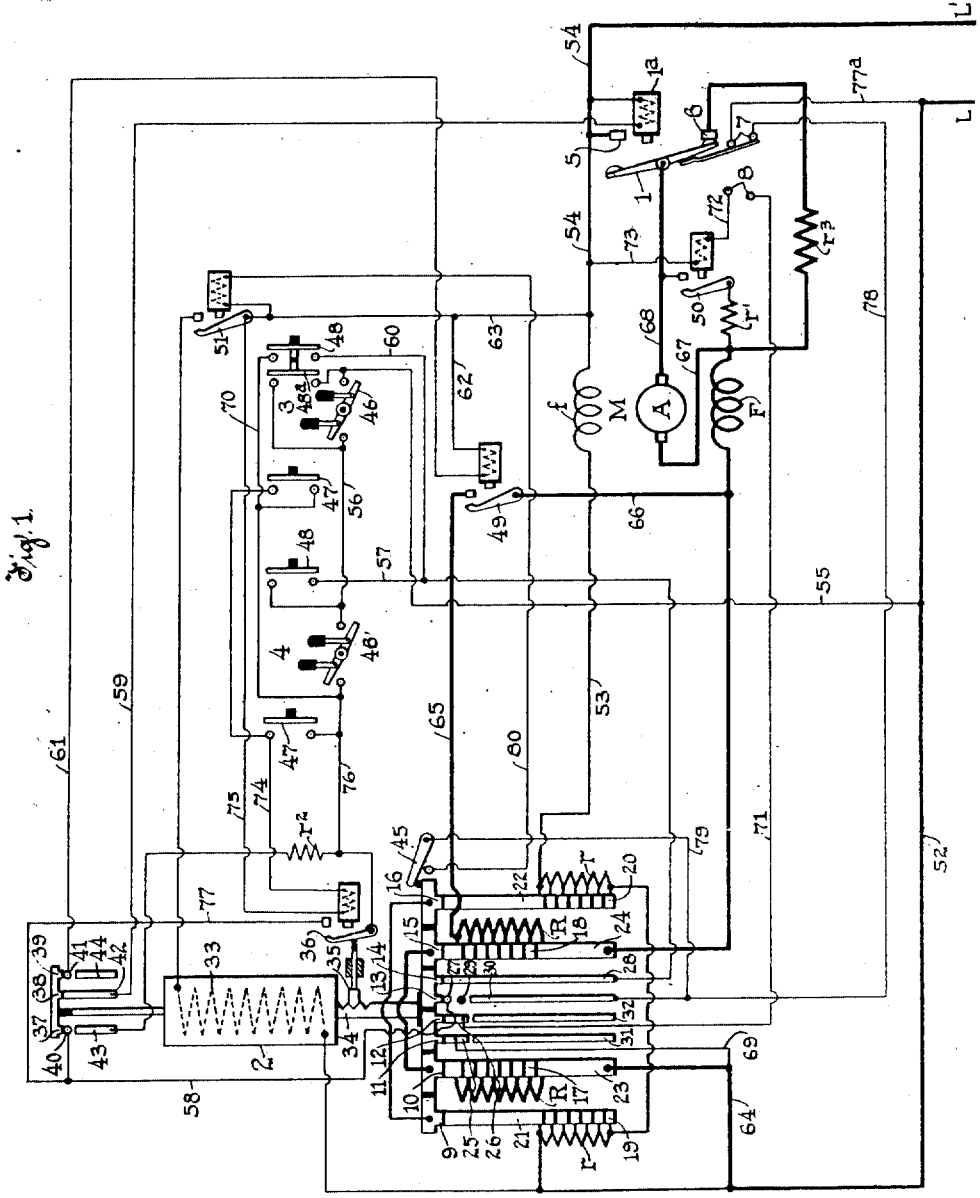
Inventor
Maurice M. Goldenstein
By Frank H. Hubbard
Attorney

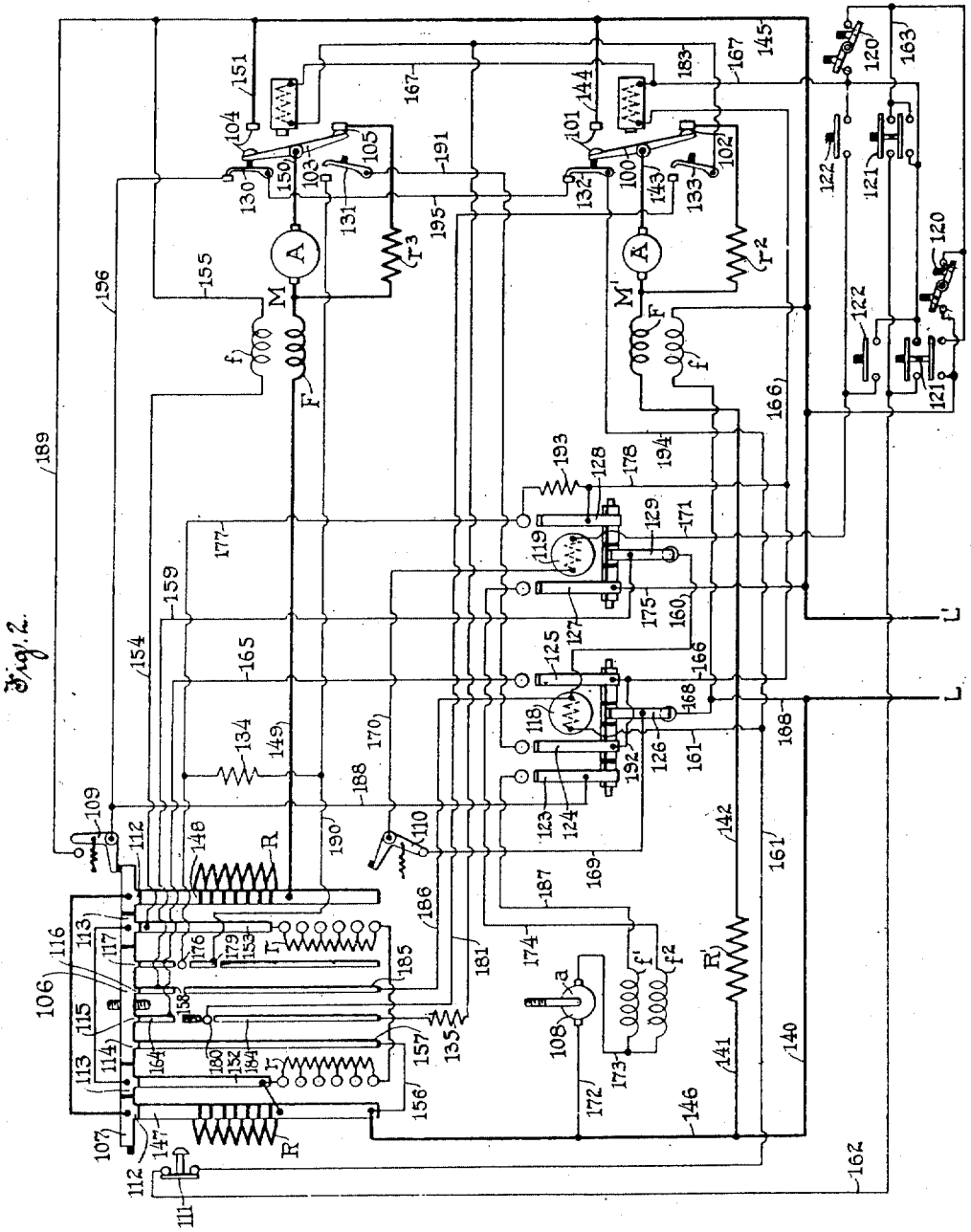

UNITED STATES PATENT OFFICE.

MAURICE M. GOLDENSTEIN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,234,151.  Specification of Letters Patent.  Patented July 24, 1917.

Application filed May 17, 1915. Serial No. 28,692.

*To all whom it may concern:*

Be it known that I, MAURICE M. GOLDENSTEIN, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers and, while not limited thereto, it is particularly applicable to motor-driven printing presses.

One of the objects of the invention is to provide a controller which will effect the various required operations with a minimum number of switches and thus, where magnetic switches are employed, with a minimum number of operating windings.

Another object is to simplify the control circuits required for an electromagnetic controller suitable for printing presses and other mechanisms and to simplify the control stations for directing the operation of the electromagnetic control means.

Another object is to provide a controller for a press having a small driving motor for starting and slow-speed and a relatively large driving motor for running, which will insure against starting of the large motor except during operation of the small motor, thereby eliminating the dangers resulting from starting of the large motor without first overcoming the inertia of the driven mechanism by the small motor.

Another object is to provide a controller which will materially reduce the risks attendant to neglect on the part of operatives to take precautions for their own protection.

Various other objects and advantages of the invention will hereinafter appear.

The invention will now be more specifically described in connection with the accompanying drawings which illustrate two embodiments thereof.

In the drawing,

Figure 1 is a diagrammatic view of a controller for a single motor drive and,

Fig. 2 is a diagrammatic view of a controller for a double motor drive.

Referring to Fig. 1, the motor M is illustrated as compound wound, being provided with an armature A, a series field F and a shunt field $f$. It is to be understood, however, that the motor might be of other types, if desired. The controller includes an electroresponsive main switch 1, a rheostat 2 to control armature resistances R and field resistances $r$ for the motor and control stations 3 and 4 each including a plurality of switches to control the main switch and rheostat through suitable relays, hereinafter specified. The control station provides for starting and stopping of the motor at will, for restricting the speed of the motor to that suitable for inching, and for varying the speed of the motor while in operation to such degrees as may be desired. Moreover, the arrangement is such that a single push-button switch serves for both inching at a predetermined speed and for gradual speed reduction when the motor is operating at an accelerated speed.

The main switch 1 has a double-ended contact arm which when attracted engages a contact 5 to complete the motor circuit and which when released engages a contact 6 to complete a dynamic braking circuit across the terminals of the motor armature. The arm is adapted to be attracted by a suitable magnet 1ª and when attracted to open a normally closed auxiliary switch 7 and close a normally open auxiliary switch 8 for purposes hereinafter set forth.

The rheostat 2 is in general of a conventional form, namely, of the cross-head type, wherein the cross-head descends by gravity for acceleration and is lifted by a solenoid for deceleration. The cross-head is represented by a series of brushes 9, 10, 11, 12, 13, 14, 15 and 16 divided into electrically independent groups. The brushes 10 and 15 are electrically connected and coöperate with series of contacts 17 and 18 respectively to control the armature resistances R while the brushes 9 and 16 are electrically connected and coöperate with series of contacts 19 and 20 respectively to control the field resistances $r$. The arrangement is such that during regulation of the armature resistances the brushes 9 and 16 travel over continuous segments 21 and 22 respectively, while during regulation of the field resistances the armature resistance brushes 10 and 15 travel over continuous segments 23 and 24 respectively. In initial position of the cross-head the remaining brushes 11, 12, 13 and 14 engage contacts 25, 26, 27 and 28 respectively to establish control circuits hereinafter specified. Upon initial descent of the cross-head the brush 13 leaves the contact 27 and, after passing over a dead contact 29, engages a continuous segment 30. As illustrated such changes in the position of the brush 13 occur before any variation of the armature resistance and as the first step of armature resistance regulation is effected the brushes 11 and 12 disengage the contacts 25 and 26 and ride onto dead segments 31 and 32. The brush 14, on the other hand, remains in engagement with segment 28 throughout the movement of the cross-head. As before stated, the cross-head descends by gravity and for raising the same there is provided a solenoid 33 having a plunger 34 suitably connected to said cross-head and notched to correspond with the various operative positions of the cross-head. These notches are provided to receive a locking pawl 35 which is biased to locking position. The pawl is associated with an electromagnetic switch 36 and is tripped upon response of said switch to release the cross-head. Thus, energization of the solenoid 33 provides for elevation of the cross-head for slow-down purposes while energization of the switch 36 effects release of the cross-head for acceleration, and, as will be apparent, the cross-head may be checked in its movement in both directions and in any desired position by deenergization of the solenoid or the magnetic switch 36, according to which is in use. In addition to the foregoing, the rheostat has associated therewith a second movable contact member represented by brushes 37, 38 and 39 which are raised by the solenoid 33 during the final upward movement of the rheostat cross-head and which descend during initial downward movement of said cross-head. In initial position of the cross-head the brushes 37 and 39 engage contacts 40 and 41 respectively while brush 38 engages a segment 42. Immediately upon the cross-head leaving initial position the brushes 37 and 39 engage segments 43 and 44 respectively and thereafter until the cross-head is returned to initial position the brushes 37, 38 and 39 remain in engagement with the segments 43, 42 and 44 respectively. The auxiliary contacts just described control the circuits of the main switch and also circuits of relay switches hereinafter specified. Still further, the rheostat has associated therewith a limit switch 45 tending to stand in closed position and adapted to be opened by the cross-head when in its extreme upper position.

The control stations each include a snap switch 46 and two normally open push-button switches 47 and 48. The push-button switches 47 serve for starting purposes and the circuit of each includes the two switches 46 in series therewith whereby said latter switches must be closed as a pre-requisite to starting by the former switches. The switches 46 in turn serve for stopping purposes and either when opened will fulfil such purpose and until reclosed will insure against restarting by either switch 47. The switches 48 also serve for starting under certain conditions, as will hereinafter appear, and each has included in series therewith the switch 46 of the other station whereby each of said former switches is rendered ineffective to start while the switch 46 of the other station is open. Switch 48 of station 3 also has its own switch 46 in series therewith but is provided with auxiliary contacts 48ª whereby when said switch 48 is closed it short-circuits its own switch 46. The two control stations function in the same manner and each functions as aforesaid through the control of various relay switches and, through certain of said switches, the rheostat 2. In practice, any desired number of control stations may be provided and additional stations may be arranged precisely the same as station 3.

More specifically considering the control station 3, the push-button switch 47 thereof controls the aforesaid relay switch 36 to effect release of the cross-head which, upon operating, energizes the main switch to start the motor and then varies the resistances R and r to accelerate the motor. However, as before stated, this result is dependent upon previous closure of both switches 46. When the push-button switch 47 is released the relay switch 36 is deënergized, thereby releasing the pawl 35 and checking the descent of the rheostat cross-head.

The push-button switch 48 performs a two-fold function according to the position of the rheostat. When the rheostat cross-head is in its upper extreme position and switch 46 of station 4 is closed, the closure of switch 48 effects energization of the main switch and of two additional electromagnetic switches 49 and 50 without releasing the cross-head of the rheostat. The switch 49 upon responding short-circuits a predetermined part of the armature resistance R while the switch 50 upon responding shunts the motor armature through a resistance R′ whereby the motor is started with its speed suitably restricted for inching. Operation of the motor under these conditions is dependent upon continued depression of switch 48 and as soon as said switch is released the main switch and the switches 49 and 50 are deënergized to arrest the operation of the motor. On the other hand, when the rheostat is in any running position depression of the push-button switch 48 has an entirely different effect. It then acts to energize an electromagnetic relay switch 51 which in turn energizes the solenoid 33 of the rheostat to lift the cross-head and thereby slow down the motor, the degree of slow-down being determined by the length of time which the switch 48 is held depressed. The switch 48 is, however, ineffective to entirely stop the motor.

Switches 46, as above set forth, provide means for stopping at will and while open insure against restarting except for inching. Moreover, the opening of either switch 46 insures against inching from another station and the opening of both insures against inching from either station.

Thus it will be observed that the utilization of the push-button switch 48 for the two functions specified reduces the number of switches required for each control station, there usually being a number of stations, and also reduces the number of electromagnetic relays required to transmit the orders of the control station. This in turn greatly simplifies the winding of the controller which is very advantageous in view of the unavoidable number of control circuits. Further, it will be observed that the interconnection of the control switches affords full protection to the operatives against injury from unexpected restarting by others stationed at different points and moreover provides for inching in an entirely safe manner without necessitating operation of the snap switch of the station employed.

More specifically describing the circuit arrangement illustrated, the same is as follows: Current is supplied from lines L and L' and with the parts positioned as shown the motor is excluded from circuit save for its shunt field. The shunt field circuit may be traced from line L by conductor 52 to rheostat contact 21 and brushes 9 and 16 of the cross-head to contact 22, by conductor 53 through the shunt field, by conductor 54 to line L'. Thus the shunt field is prepared for starting of the motor although, of course, it might be disconnected from circuit or the flow of current therethrough reduced when the motor is idle.

Assume now that it is desired to inch or tease the motor from station 4, switch 46 of station 3 being closed. This requires closure of switch 48 of station 4 which completes circuit from line L by conductors 52 and 55 through switch 46 (station 3) by conductor 56 through said switch 48, by conductor 57 to rheostat segment 28, by brushes 14 and 13 to contact 27, by conductor 58 to auxiliary contact 40 of the rheostat, by brushes 37 and 38 to contact 42, by conductor 59 through the operating winding 1ª of main switch 1, to line L'. At the same time circuit is closed as already traced to auxiliary contact 40 of the rheostat, thence through brushes 37 and 39 to auxiliary contact 41, by conductor 61 through the winding of switch 49, by conductors 62, 63 and 54 to line L'. This short-circuits the right-hand armature resistance R, whereby upon closure of the main switch the motor circuit is established from line L by conductors 52 and 64 through the left hand armature resistance to and through the cross-head brushes 10 and 15, by conductor 65 through switch 49, by conductor 66 through the series field F, by conductor 67 through the motor armature, by conductor 68 through the main switch 1, and by conductor 54 to line L'. Thus the motor is started with a predetermined amount of the armature resistance excluded from circuit, and main switch 1 in closing the motor circuit actuates auxiliary switch 8 to energize switch 50. This energizing circuit extends from line L by conductors 52, 64 and 69 to rheostat contact 25 and across brushes 11 and 12 to contact 26, by conductor 71 through auxiliary switch 8 of main switch 1, by conductor 72 through the winding of switch 50, by conductors 73 and 54 to line L'. Switch 50 is accordingly energized and completes a shunt around the motor armature through the resistance $r'$. The usual inching connections are thus provided for the motor when started by operation of control switch 48. When control switch 48 is released it obviously interrupts the energizing circuit of main switch 1, thereby interrupting the motor circuit and deënergizing the armature shunt switch 50. Also, it deënergizes switch 49, whereby all resistance R is reinserted in the armature circuit. Switch 48 (station 3) has its main contacts paralleled with the contacts of switch 48 (station 4) and thus may be used in the same manner as that described for inching purposes. However, the paralleling connections include the snap switch 46 (station 4) whereby said snap switch must be closed to render station 3 effective. These paralleling connections may be readily traced from conductor 56 through switch 46 of station 3, by conductor 70 to and through the main contacts of switch 48 (station 3) by conductor 60 to conductor 57. With the switch 46 of station 3 open then the switch 48 when closed parallels said former switch through its auxiliary contacts 48ª, said paralleling connections being obvious. Thus each inching switch is dependent upon closure of safe switch of the other station but is independent of its respective safe switch. Consequently the operator is saved the trouble of actuating the safe switch of the selected station when inching and is moreover insured a safe setting of the station employed, following the conclusion of inching operation.

Assume now that both switches 46 are closed and that it is desired to start the motor for normal operation from station 4. Switch 47 is then closed to complete circuit from line L through switches 46 in series and thence through said switch 47 by conductor 74 through the winding of relay switch 36, by conductors 75, 63 and 54 to line L'. This trips the pawl 35, thereby allowing the rheostat cross-head to descend and also closes the switch 36. Hence upon initial descent of the cross-head circuit is closed from line L through switches 46, by conductor 76 through switch 36, by conductor 77 to auxiliary contact 40 of the rheostat, across brushes 37 and 38 to contact 42 and thence by conductor 59 to and through the winding of main switch 1, as already traced. Also, circuit will be closed through auxiliary contacts 39 and 41 by conductor 61 through winding of relay 49. Under these conditions it will be observed that the motor is started as above described and that as the cross-head descends it deënergizes relay 49 and gradually excludes the armature resistance while if permited to descend to a sufficient degree, gradually inserts the resistance $r$ in series with the shunt field of the motor. Thus, by varying the degree of descent of the cross-head by depression of the push-button switch 47 the motor may be accelerated to any selected speed. After initial movement of the cross-head the energizing circuit of the main switch is shifted from auxiliary contact 40 to contact 43, thereby including in said circuit its interlocking resistance $r^2$. Switch 47 (station 3) is paralleled with switch 47 (station 4) and thus also functions as just described.

When it is desired to stop the motor this may be effected by opening either snap switch 46 which deënergizes main switch 1 to open the motor circuit and to establish the aforesaid dynamic braking circuit which is traceable through the braking resistance $r^3$. Moreover, switch 1 in opening permits closure of its auxiliary switch 7, which completes circuit from line L by conductor 77a through said auxiliary switch, by conductors 78 and 79 through limit switch 45 of the rheostat, by conductor 80 through the winding of relay switch 51, to conductors 63 and 54 and thence to line L'. Relay switch 51 thereupon responds to connect the rheostat solenoid directly across the lines L and L', as is obvious from the drawing and energization of said solenoid effects return of the rheostat cross-head to initial position, whereupon it opens auxiliary switch 45 to deënergize relay switch 51 which in turn deënergizes solenoid 33. Thus, upon opening of the motor circuit the rheostat is automatically returned to initial position thereby preparing the motor for restarting.

Assume now that the motor is in operation and it is desired to reduce the speed thereof without stopping. This may be effected by depression of either push-button switch 48. Such operation of either switch 48 completes circuit from line L to conductor 57, thence to rheostat segment 28 by brushes 14 and 13 to rheostat segment 30, by conductor 79 through switch 45 to and through the winding of relay switch 51, as previously traced. Relay switch 51 thereupon responds to energize the rheostat solenoid 33 to raise the cross-head as already described, the degree of elevation of the cross-head, and in consequence the degree of speed reduction, being dependent upon the duration of depression of the switch 48. As will be apparent when the switch 48 is released it effects deënergization of relay 51 and in consequence deënergization of the rheostat solenoid 33. The motor then continues to operate at the selected reduced speed until stopped in the manner already described. As above stated, the switches 48 are ineffective for stopping and this will be obvious from the fact that said switches are only effective for slowdown while engagement is maintained between the cross-head brush 13 and segment 30, and that said brush disengages said segment prior to return of the cross-head to an extent sufficient to affect interruption of the motor circuit.

Referring now to Fig. 2 the motors M and M' constitute the driving motors and, for the purpose of illustration, both are shown as of the compound type, having armatures A, series fields F and shunt fields $f$. Further, as is customary in printing press control, one motor M' is relatively small to be used for starting, inching, and slow speed, while the other motor, M, is relatively large for operating the press at normal running speeds.

The small motor M' has an electromagnetic control switch 100 which upon energization connects said motor across the supply lines L—L' through a suitable resistance R' while upon deënergization it shunts the motor armature through a suitable resistance $r^2$ for dynamic braking. As above set forth, the motor M' is used only for starting and inching and no provision is made for varying the speed thereof. Contacts 101 of the switch 100 control the motor circuit while contacts 102 control the aforesaid dynamic braking circuit.

The large motor M has an electromagnetic control switch 103 similar to that of motor M'. This switch has contacts 104 for completing the circuit of the motor and contacts 105 for shunting the motor armature through a resistance $r^3$ for dynamic braking. Motor M is also provided with speed regulating means and is controllable similarly to the motor of Fig. 1. In practice the motor might be controlled by a rheostat similar to that shown in Fig. 1 but in this instance the rheostat 106 is illustrated as of the motor operated type. It has a cross-head 107 adapted to be operated through a screw shaft by a pilot motor 108 having field windings $f'$ and $f^2$ of opposite polarity for effecting reverse operations thereof. The cross-head 107, as in the rheostat of Fig. 1, controls armature resistances R and field resistances $r$ for the motor M and in addition controls pilot circuits, hereinafter set forth and, through limit switches 109 and 110, controls the operation of its driving motor 108. Also, the rheostat has associated therewith a normally closed switch 111 which is opened by the cross-head in a certain position of the latter. More specifically describing the rheostat, the cross-head thereof carries three sets of electrically independent brushes. One set includes brushes 112 at opposite ends thereof to coöperate with segments and contacts connected to the armature resistances. A second set includes brushes 113 to coöperate with segments and contacts connected to the field resistances. The third set includes brushes 114, 115, 116 and 117 to coöperate with segments and contacts as hereinafter set forth.

The operation of the aforesaid automatic devices is governed by electro-responsive relays 118 and 119 which in turn are governed by push-button control stations each including switches 120, 121 and 122 structurally and functionally similar to those of station 3, Fig 1. The relay 118 is of the double-throw type and has three poles 123, 124 and 125 for completing circuit upon energization thereof and a pole 126 for completing circuit upon deënergization thereof. Relay 119 is similar to relay 118 and has two poles 127 and 128 for completing circuit upon energization thereof and one pole 129 for completing circuit upon deënergization thereof. The control means also includes auxiliary switches 130 and 131 associated with switch 103 and auxiliary switches 132 and 133 associated with switch 100. Switches 130 and 132 tend to stand in open position and are closed by switches 103 and 100 respectively when deënergized, while switches 131 and 133 tend to stand in open position and are closed by switches 103 and 100 respectively upon response thereof.

Briefly set forth the controller operates and functions as follows: With the cross-head of the rheostat in the position illustrated the switches 121 serve for inching purposes. Each when depressed energizes relay 118 which responds to energize switch 100, thereby connecting in circuit the small motor M'. This provides for slow speed operation of the press or other driven mechanism so long as the switch 121 is held depressed and for immediate disconnection of the motor M' upon release of said switch 121. Under these conditions the rheostat remains inert and as will hereinafter appear, operation of the control switch of the large motor M is dependent upon operation of the rheostat. On the other hand, with the cross head in the position illustrated the driven mechanism may be started and brought up to the desired speed by depression of either push-button switch 122. This effects energization of relay 119 which upon response completes circuit of pilot motor 108 through its field winding $f^2$. Such connection of the pilot motor effects operation thereof to move the cross-head away from the position illustrated and this operation of the cross-head effects the following results: First, it completes circuit through the winding of switch 100 thereby effecting response of said switch and starting of the small motor M'. This starts and operates the press or other mechanism at slow speed as already set forth. Then continued movement of the cross-head inserts an interlocking resistance 134 in circuit with the winding of switch 100 and completes the energizing circuit of switch 103 through the auxiliary switch 133 of switch 100. Thus switch 103 is energized, subject to prior and continued energization of switch 100, to start the large motor M. Then the cross-head acts to open the energizing circuit of switch 100 and to insert an interlocking resistance 135 in circuit with the winding of switch 103. Thereafter the cross-head gradually excludes the armature resistances and inserts the field resistances of motor M. In assuming such continued operation of the rheostat it is also assumed that the switch 122 is held depressed for the pilot motor is disconnected from circuit immediately upon release of said switch. Thus, in the controller of Fig. 2 the acceleration of the large motor may be checked at any time for the desired speed of the driven mechanism by merely releasing the push-button 122. Should, however, the push-button switch be held depressed until full operation of the rheostat, then said rheostat would operate its limit switch 110 to deënergize relay 119 and thereby disconnect the pilot motor from circuit. As will be understood, the aforesaid interlocking resistances 134 and 135 serve to prevent reclosure of their respective switches, should the same for any reason drop out, until after return of the rheostat to initial position.

When the rheostat is in running positions then the push-button switches 121 are converted from inching switches into off or slow-down switches. Under these conditions closure of either switch 121 energizes relay 118 which responds to complete the circuit of the pilot motor through its field winding $f'$, thereby effecting movement of the cross-head toward initial position. This tends to slow-down the large motor M' and to a degree dependent upon the duration of depression of switch 121, said switch when released effecting arrest of the cross-head. If the switch 121 is held depressed for a sufficient period the drive is restored to the small motor and the large motor is stopped but the switch 111 associated with the rheostat cross-head renders the switch 121 ineffective to entirely stop the driven mechanism. As in the controller of Fig. 1, the function of stopping is limited to the snap switches 120 with the attendant protection above discussed. When either switch 120 is opened it deënergizes both motor switches, or either one that may happen to be closed, thereby insuring disconnection of both motors from circuit. Moreover, said motor controlling switches upon opening close their respective auxiliary switches 130 and 132 to complete an energizing circuit for the off relay to return the cross-head to initial position. This circuit is independent of the auxiliary switch 111 associated with the cross-head but extends through the limit switch 109 whereby it is opened automatically upon full return movement of the cross-head.

It will thus be observed that this controller affords the same flexibility of control and the same protection as that shown in Fig. 1. Also, it will be observed that the inching and off relays are combined in a single magnetic switch and that a single magnetic switch also serves to control the starting of the driven mechanism and the accelerating operation of the motor-driven rheostat.

More specifically describing the circuit arrangement illustrated the motor circuits are as follows: that of motor M' extends from line L by conductors 140 and 141 through resistance R' by conductor 142 through the series field F and armature A, by conductor 143 through contacts 101 of switch 100, when closed, by conductors 144 and 145 to line L', the shunt field f of said motor being connected directly across lines L and L' as is apparent. The circuit of large motor M extends from line L by conductors 140 and 146 through the left hand armature resistance R to rheostat segment 147 and thence across brushes 112 to rheostat segment 148 through right hand armature resistance R by conductor 149 through the series field F and armature A, by conductor 150 through contacts 104 of switch 103 when closed, by conductors 151 and 145 to line L'. The shunt field circuit of this motor extends to the rheostat as already traced, by segment 152 and brushes 113 to segment 153 and thence by conductor 154 through field f, by conductors 155 and 145 to line L'.

Assuming now that the rheostat cross-head is in the position illustrated, closure of right hand switch 121 completes circuit from line L by conductors 140, 146 and 156 to rheostat segment 157 across brushes 114 and 116 to rheostat segment 158, by conductor 159 through pole 129 of relay 119, by conductor 160 through the winding of relay 118, by conductor 161 through auxiliary switch 111 of the rheostat, by conductor 162 through the upper contacts of switch 121, by conductor 163 through left hand switch 120 to conductor 145 and line L'. This effects response of relay 118 which, with the rheostat in the position illustrated, energizes switch 100, as above described. The energizing circuit of switch 100 may be traced as already described to rheostat segment 157 across brushes 114 and 115 to segment 164, by conductor 165 through pole 125 of relay 118, by conductor 166 through the winding of switch 100, by conductor 167 through the lower contacts of depressed switch 121, by conductor 163 through left hand switch 120 to line L'. Left hand switch 121 functions in the same manner and the slight variations in the connections established thereby are obvious.

Again assume that the cross-head is in the position illustrated and that right-hand switch 122 is closed. This completes the energizing circuit of relay 119. This circuit extends from line L by conductor 168 through the pole 126 of relay 118, by conductor 169 through rheostat limit switch 110, by conductor 170 through the winding of relay 119, by conductor 171 through said switch 122 and thence through both switches 120 to line L'. Relay 119 upon responding completes circuit from line L by conductors 140, 146 and 172 through the armature a of pilot motor 108, by conductor 173 through the field $f^2$ of said motor, by conductor 174 through pole 127 of relay 119, by conductors 175 and 145 to line L'. This starts the pilot motor as above set forth in a direction to move the rheostat cross-head away from initial position and when brush 117 of said cross-head engages contact 176 it completes circuit by conductor 177 through pole 128 of relay 119, by conductor 178 to conductor 166 and thence through the winding of switch 100 as already traced. Then when the cross-head leaves contact 176 and passes onto contact 179 it includes interlocking resistance 134 in the circuit just described, whereas still further movement of the cross-head disengages brush 117 from contact 179 and opens said circuit. During the operation of the cross-head just set forth, and before the brush 117 leaves segment 179, the brush 115 thereof engages contact 180, thereby completing circuit by conductor 181 through the auxiliary switch 133 of switch 100, by conductor 183 through the winding of switch 103, by conductor 167 to and through both switches 120 to line L'. This energizes the large motor switch prior to interruption of the circuit of the small motor switch. Then as the cross-head passes from contact 180 to segment 184 it establishes a circuit direct from rheostat brush 115 to the winding of switch 103 through interlocking resistance 135 and interrupts the connections above described. The motors are thereby set in operation progressively and by inclusion of the auxiliary switch 133 of switch 100 in the energizing circuit of switch 103 the initial energization of the latter switch is rendered dependent upon prior and continued energization of switch 100.

Assuming now that the rheostat is in a running position, either push-button switch 121 when depressed completes circuit from line L by conductors 140, 146 and 156 to rheostat segment 157 across brushes 114 and 116 to segment 185, by conductor 186 through the winding of relay 118, by conductor 161 through auxiliary switch 111, by conductor 162 through closed switch 121, and thence through one or both switches 120 to line L', depending upon the switch 121 employed. This energizes relay 118 which upon responding completes circuit from line L by conductors 140, 146 and 172 through the armature $a$ of motor 108, by conductor 173 through the field $f'$ of said motor, by conductor 187 through pole 123 of relay 118, by conductor 188 through limit switch 109, by conductors 189 and 145 to line L'. The motor 108 is thereby set in operation for return of the rheostat cross-head toward initial position and such movement of the cross-head gradually excludes the field resistance, if previously included, then gradually reinserts the armature resistance and upon passing onto contact 179 reëstablishes the circuit of the small motor switch 100. This circuit extends from line L to contact 179 as already traced, by conductor 190 through auxiliary switch 131 which is now closed by conductor 191 through pole 124 of relay 118 to conductors 192 and 166 and thence through the winding of switch 100 as already traced. Then as the cross-head continues it passes off of contact 180 and thereby deënergizes the main switch 103 of the large motor which is quickly brought to rest by the establishment of its dynamic braking circuit. At this time the auxiliary switch 111 is opened by the cross-head and this deënergizes relay 118 thereby arresting further return movement of the cross-head. The opening of the main switch of the large motor, and in consequence its auxiliary switch 131, and the further deënergization of relay 118, interrupts the circuit just described for the small motor switch 100, but a maintaining circuit is established whereby continued energization of switch 100, and in consequence continued operation of the small motor, is insured. This maintaining circuit is traceable from contact 179 through the resistance 134 by conductor 177 through a resistance 193 shunting pole 128 of relay 119, by conductor 178 to conductor 166 and thence through the winding of switch 100 to line L'. As before explained, return movement of the rheostat cross-head is dependent upon continued depression of one of the switches 121 and hence the return of the cross-head may be checked at any point upon release of the switch. In connection with the slow-down, it is to be noted that in order to restart the small motor, the main switch of the large motor must be maintained closed for completing, through its auxiliary switch 131, the energizing circuit of the small motor switch, the advantages of this provision being obvious.

Assume now that the drive is in operation and that either snap switch 120 may be opened. This will deënergize either or both of the main switches of the driving motors, thereby arresting operation of both motors. Opening of these switches effects closure of auxiliary switches 130 and 132 thereof, which establishes an energizing circuit for relay 118, which thereupon responds to complete the circuit of motor 108 for return of the rheostat cross-head to initial position. In accordance with the position of the cross-head the energizing circuit of relay 118 may be traced either from rheostat segment 185 by conductor 186 direct to the winding of said relay, or from rheostat segment 158 by conductor 159 through the pole 129 of relay 119, by conductor 160 to said winding. In either case the return circuit is traceable from said winding by conductors 161 and 194 through the auxiliary switch 132 of switch 100, by conductor 195 through auxiliary switch 130 of switch 103, by conductor 196 through the limit switch 109, by conductors 189 and 145 to line L'. These two alternative circuits provide for energization of the relay 118 until the cross-head is fully returned to initial position, whereupon limit switch 109 is opened to deënergize said relay.

Obviously both controllers illustrated are susceptible of various modifications and it should be understood that said controllers have been selected merely as illustrating certain embodiments of the invention hereinafter claimed.

What I claim as new and desire to secure by Letters Patent is:

1. In combination, power operated motor-controlling means, a control device therefor and means associated with said power operated means to commutate the control connections between the latter and said device whereby said device may be operated in the same way under different conditions to effect functionally different operations of said power operated means.

2. In combination, motor-controlling means including a plurality of power operated parts, a common control device for said parts and means associated with said motor-controlling means whereby said device may be operated in the same way to control said power operated parts selectively under different conditions.

3. In combination, motor-controlling means having a plurality of operating windings for effecting different functional operations thereof, a common control device for said windings and means associated with said motor-controlling means to commutate the connections between said device and said windings whereby said device may be operated in the same way to effect functionally different operations of said controlling means under different conditions.

4. In a controller for motor driven mechanisms, in combination, power operated control means for effecting starting and speed variation of the driven mechanism and a control device for said means operable in the same way to effect starting of the driven mechanism or slow-down thereof, the action of said device being determined by said control means.

5. In a controller for motor driven mechanisms, in combination, power operated means for effecting starting and speed regulation of the driven mechanism, and a control device for said means operable in the same way and under the direction of said means to either effect starting of the driven mechanism or slow-down thereof to varying degrees determinable thereby.

6. In a motor controller, in combination, power operated starting and speed regulating means, a control device for said means and means associated with said power operated means to vary the effect of said control device thereon whereby said device may be operated in the same way to effect different functional operations of said power operated means under different conditions.

7. In a controller for a motor-driven mechanism, in combination, power actuated means for controlling the operation of the driven mechanism, a push-button control device for said means operable under certain conditions to start the driven mechanism and upon release to stop the same and operable in the same way under other conditions to effect slow-down of the driven mechanism to varying degrees dependent upon the retention thereof in operative position.

8. In a controller for a motor-driven mechanism, in combination, power operated means for controlling the starting and acceleration of the driven mechanism, and a control device for said means functioning subject to control by said means to either effect starting of the driven mechanism or slow-down thereof from an augmented speed.

9. In a controller for a motor-driven mechanism, in combination, power operated means for controlling the starting and acceleration of the driven mechanism, a control device for said means functioning subject to control by said means to either effect starting of the driven mechanism or slow-down thereof from an augmented speed and means rendering said device ineffective to stop said mechanism.

10. In a controller for motor-driven mechanisms, in combination, power-operated means for effecting slow speed operation of the mechanism, power operated means for effecting an increase in the speed of the mechanism and a common control device for the aforesaid means to effect operation of the same selectively under different predetermined conditions.

11. In a controller for motor driven mechanisms, in combination, starting means, slow-down means, a common control device therefor and automatic means for varying the action of said device with respect to the aforesaid means.

12. In a controller for motor-driven mechanisms, in combination, starting means, slow-down means, a common control device for said means and automatic means rendering said device operable in the same way for starting the mechanism for slow speed operation and when the mechanism is in operation at an increased speed to slow down the same.

13. In a controller for motor-driven mechanisms, in combination, power operated starting means, power operated speed regulating means, a device to control both of said means and means associated with said speed regulating means to vary the controlling action of said device according to the position of said speed regulating means.

14. In a controller for motor-driven mechanisms, in combination, starting means, speed regulating means, a control device and means associated with and operated by said speed regulating means to place said starting means under the control of said device but only for slow speed operation and to place itself under the control of said device but only for slow-down.

15. In a controller for motor-driven mechanisms, in combination, electromagnetic starting means, electromagnetic speed regulating means, a common control device therefor and means associated with and operated by said speed regulating means to limit the control action of said device thereon to slow-down.

16. In a controller for motor-driven mechanisms, in combination, starting means, speed regulating means, a common control device for said means and means associated with and actuated by said speed regulating means to render the control action of said device dependent upon the position of said speed regulating means.

17. In combination, starting means, speed-regulating means, a common control device therefor, and means associated with and actuated by said speed-regulating means to render the use of said device for starting dependent upon predetermined positioning of said speed regulating means and for limiting the use of said device for speed regulation to accomplishment of slow-down.

18. In a controller for motor-driven mechanisms, in combination, electromagnetically controlled starting means, electromagnetically controlled speed regulating means, a control device, and means rendering said starting means responsive to said device but only in a predetermined position of said speed regulating means and rendering said speed regulating means responsive to said device but only for slow-down purposes.

19. In a controller for motor-driven mechanisms, in combination, electromagnetically controlled starting and speed regulating means and a control station for said means including a switch to effect starting and acceleration of the driven mechanism and a second switch operable when the mechanism is at rest to start the same for operation at a predetermined speed and operable in the same way when the mechanism is in operation at an accelerated speed to slow-down the same.

20. In a controller for motor-driven mechanisms, in combination, electromagnetically controlled starting and speed regulating means, a control device and means rendering said former means responsive in different ways upon like operations of said device according to the condition of said means.

21. In a controller for motor-driven mechanisms, in combination, electromagnetically controlled starting and speed regulating means, a control device and means rendering said former means responsive in different ways upon like operations of said device according to the position of the speed regulating part of said former means.

22. In a controller for motor-driven mechanisms, in combination, electro-responsive means controlling the power supply, a plurality of control stations for said means each including an inching switch and a safe switch and circuit connections for said stations rendering the inching switch of each independent of its respective safe switch but dependent upon setting of the remainder of said safe switches.

23. In a controller for motor-driven mechanisms, in combination, electro-responsive means controlling the power supply, a plurality of control stations for said means each including an inching switch and a safe switch, and circuit connections whereby the safe switch of each station is included in series with the inching switch of each remaining station and whereby the inching switch of each station short-circuits its respective safe switch when operated for inching.

24. In a controller for motor-driven mechanisms, in combination, electro-responsive means controlling the power supply, a control station for said means including a starting switch, a slow-down switch and a safe switch and circuit connections whereby said means after response to said starting switch maintains the power supply until operation of said safe switch.

25. In a controller for motor-driven mechanisms, in combination, electro-responsive means controlling the power supply, a plurality of control stations for said means each including a starting switch, a slow-down switch and a safe switch and connections whereby each of said starting switches is dependent upon setting of all of said safe switches and whereby operation of one of said safe switches is required for interruption of the power circuit after response of said means to any one of said starting switches.

26. In a controller for motor-driven mechanisms, in combination, electro-responsive means controlling the power supply, a plurality of control stations each including a starting switch, a stopping switch, and a combined inching and slow-down switch and connections rendering each of said starting switches dependent for effectiveness upon predetermined positioning of all of said stopping switches and for rendering each of said combined switches dependent for inching operation upon predetermined position of each stopping switch other than its respective stopping switch and independent of positioning of the latter.

27. In a controller for motor-driven mechanisms, in combination, electro-responsive means controlling the power supply, a plurality of control stations for said means each including a starting switch, a combined inching and slow-down switch and a safe switch, and connections whereby said combined switch of each station is effective for inching independently of its respective safe switch but dependent upon the positioning of the remainder of said safe switches and whereby operation of one of said safe switches is required for stopping after operation of said power-controlling means in response to any one of said starting switches.

28. In a controller for a plurality of motors, in combination, separate starting means for the motors operable in progression and means rendering initial operation of one dependent upon prior and simultaneous operation of another.

29. In a controller for a plurality of motors, in combination, separate electro-responsive starting means for the motors, and means rendering the response of one dependent upon prior response and continued energization of another.

30. In a controller for a driven mechanism having a plurality of driving motors, in combination, separate electro-responsive starting means for the motors, means rendering the response of one of said starting means dependent upon prior response and continued energization of another in accelerating the driven mechanism and for rendering the response of the former dependent upon continued energization of the latter in decelerating the driven mechanism.

In witness whereof, I have hereunto subscribed my name.

MAURICE M. GOLDENSTEIN.

Copies of this patent may be obtained for five cents each, by addressing the "Commissioner of Patents, Washington, D. C."